US012565935B2

(12) United States Patent
Willers et al.

(10) Patent No.: US 12,565,935 B2
(45) Date of Patent: Mar. 3, 2026

(54) BALL VALVE

(71) Applicant: OTTO EGELHOF GmbH & Co. KG, Fellbach (DE)

(72) Inventors: Eike Willers, Stuttgart (DE); Peter Bohnenstengel, Esslingen (DE)

(73) Assignee: OTTO EGELHOF GMBH & CO. KG, Fellbach (DE)

( * ) Notice: Subject to any disclaimer, the term of this patent is extended or adjusted under 35 U.S.C. 154(b) by 0 days.

(21) Appl. No.: 18/226,468

(22) Filed: Jul. 26, 2023

(65) Prior Publication Data

US 2024/0035578 A1 Feb. 1, 2024

(30) Foreign Application Priority Data

Jul. 27, 2022 (DE) .......................... 102022118859.0

(51) Int. Cl.
F16K 5/06 (2006.01)
F16K 27/06 (2006.01)
F16K 41/06 (2006.01)

(52) U.S. Cl.
CPC .......... F16K 5/0605 (2013.01); F16K 5/0636 (2013.01); F16K 5/0647 (2013.01); F16K 5/0689 (2013.01); F16K 27/067 (2013.01); F16K 5/0694 (2013.01); F16K 41/066 (2013.01)

(58) Field of Classification Search
CPC .... F16K 5/0605; F16K 5/0647; F16K 5/0689; F16K 5/0636; F16K 5/0694; F16K 41/066
See application file for complete search history.

(56) References Cited

U.S. PATENT DOCUMENTS

| | | | |
|---|---|---|---|
| 3,266,769 A | 8/1966 | Shand | |
| 3,422,851 A * | 1/1969 | Ray | F16K 5/0605 |
| | | | 137/596.17 |
| 3,512,546 A * | 5/1970 | King | F16K 5/0626 |
| | | | 137/312 |
| 3,603,560 A | 9/1971 | Merrill et al. | |

(Continued)

FOREIGN PATENT DOCUMENTS

| | | |
|---|---|---|
| DE | 7306801 U | 6/1973 |
| DE | 3336099 A1 | 4/1984 |

(Continued)

*Primary Examiner* — Craig M Schneider
*Assistant Examiner* — Christopher D Ballman
(74) *Attorney, Agent, or Firm* — KRIEGSMAN & KRIEGSMAN

(57) ABSTRACT

Ball valve having a housing which comprises at least one inlet opening and at least one outlet opening, between which a regulating chamber is provided, having a valve which is arranged in the regulating chamber and comprises at least one spherical control surface with at least one passage that connects one inflow opening to an outflow opening of the valve, having a connection opening in the housing, which opens into the regulating chamber into which a connection housing can be inserted, wherein at least one seal is provided between the connection housing and the connection opening, and the connection housing comprises a shaft feed-through having a shaft mounted therein by means of which the valve can be controlled, wherein the valve with the at least one spherical control opening is insertable through the connection opening into the regulating chamber.

16 Claims, 9 Drawing Sheets

(56) References Cited

U.S. PATENT DOCUMENTS

Figure 1:
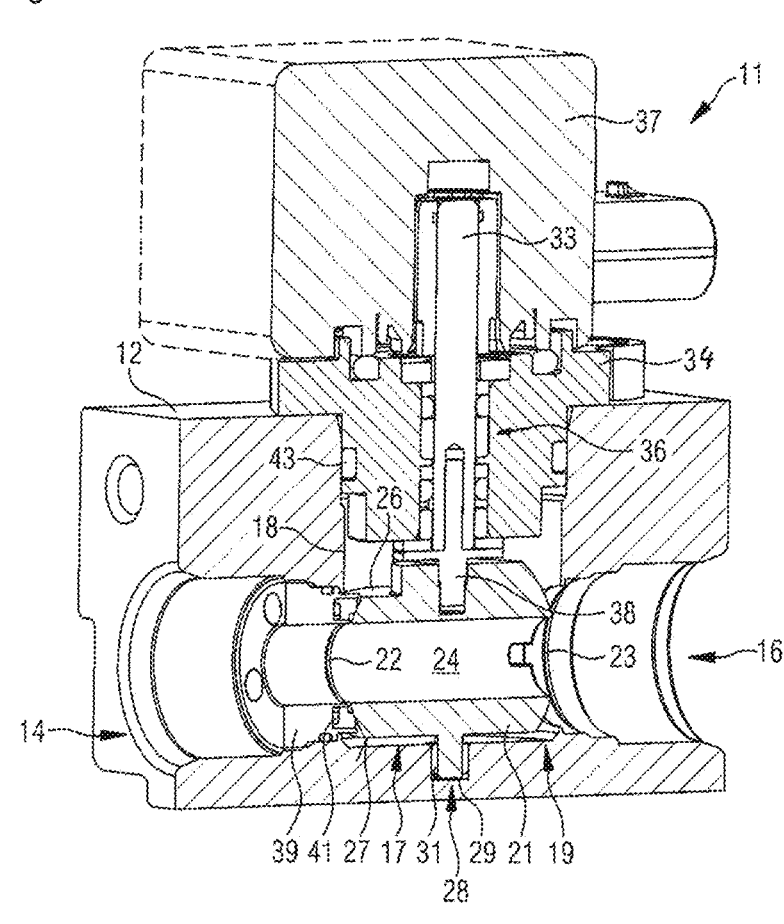

| | | | | |
|---|---|---|---|---|
| 3,731,904 A * | 5/1973 | Valince | ............... | F16K 5/201 |
| | | | | 251/315.13 |
| 4,718,444 A * | 1/1988 | Boelte | ............... | F16K 5/0636 |
| | | | | 251/188 |
| 4,881,718 A * | 11/1989 | Champagne | ......... | F16K 5/0605 |
| | | | | 251/316 |
| 5,181,539 A * | 1/1993 | Yokoyama | ............ | F16K 5/06 |
| | | | | 251/315.04 |
| 5,524,863 A * | 6/1996 | Davis | ................... | B08B 9/00 |
| | | | | 251/127 |
| 6,378,841 B1 * | 4/2002 | Russell | ............... | F16K 5/201 |
| | | | | 251/192 |
| 6,681,793 B2 * | 1/2004 | Mike | ................ | F16K 5/0636 |
| | | | | 251/315.12 |
| 7,306,010 B2 * | 12/2007 | Gruener, Sr. | ........ | F16K 5/0647 |
| | | | | 251/315.16 |
| 7,448,410 B2 * | 11/2008 | Keiser | ............... | F16K 5/0605 |
| | | | | 251/171 |
| 8,262,062 B2 * | 9/2012 | Kamo | ............... | F16K 5/0428 |
| | | | | 251/286 |
| 8,490,945 B2 * | 7/2013 | Keeper | ............... | F16K 5/188 |
| | | | | 251/315.1 |

| | | | | |
|---|---|---|---|---|
| 9,441,741 B2 * | 9/2016 | Le Pellec | ............ | F16K 41/003 |
| 9,897,218 B2 | 2/2018 | Gamache | | |
| 10,288,179 B2 * | 5/2019 | Vuichard | .......... | F16K 11/0873 |
| 10,465,804 B2 * | 11/2019 | Watanabe | ............. | F17C 5/007 |
| 10,928,077 B2 * | 2/2021 | Arrus | ................ | F24D 19/1024 |
| 10,969,024 B2 * | 4/2021 | Tsai | ................... | F16K 11/076 |
| 11,047,492 B2 * | 6/2021 | Kawamoto | .......... | F16K 31/055 |
| 11,054,044 B2 * | 7/2021 | Bell | .................... | F16K 5/202 |
| 11,226,043 B2 * | 1/2022 | Mouri | ................ | F16K 5/201 |
| 11,255,444 B2 | 2/2022 | Seeger et al. | | |
| 11,313,477 B2 * | 4/2022 | Liu | ................... | F16K 35/10 |
| 11,378,191 B2 * | 7/2022 | Wang | ................ | F16K 11/085 |
| 11,781,657 B2 * | 10/2023 | Zens | ................ | B60H 1/00485 |
| | | | | 251/315.16 |
| 12,013,192 B2 * | 6/2024 | Kawasaki | ............ | F16K 11/076 |
| 2010/0200078 A1 * | 8/2010 | Timko | ................ | F16K 5/0668 |
| | | | | 251/315.01 |

FOREIGN PATENT DOCUMENTS

| | | | |
|---|---|---|---|
| DE | 3821060 | A1 | 3/1989 |
| DE | 102012111467 | A1 | 6/2013 |
| DE | 102012013677 | A1 | 1/2014 |
| DE | 202016106129 | U1 | 12/2016 |
| DE | 102021113817 | A1 | 12/2021 |

* cited by examiner

Fig.3

BALL VALVE

The invention relates to a ball valve, in particular for use in a refrigerant circuit of a refrigeration system.

A ball valve is known from DE 10 2012 111 467 A1. This ball valve comprises a housing with an inlet opening and an outlet opening. A regulating chamber is provided between the inlet opening and the outlet opening. A ball with an inflow opening and an outflow opening, which are connected to one another by a passage channel, is inserted into the regulating chamber of the housing through the inlet opening. The inlet opening is subsequently closed with a closure means, wherein a seal of the closure means engages on the circumferential surface of the ball. To control the ball, a shaft is inserted via a connection opening into the housing, which shaft is provided in a shaft bearing. The ball is controlled with regard to its switching positions by means of a motor that is placed on the end of the shaft.

This arrangement has the disadvantage that assembly is time-consuming.

The invention is based on the object of proposing a ball valve which can be assembled easily and quickly.

This object is achieved by way of a ball valve in which the at least one spherical control surface can be inserted through the connection opening of the housing into the regulating chamber and can be positioned between the inlet opening and the outlet opening, and in which the spherical control surface has a lower connection portion on which a pivot bearing is provided which can be positioned in a bearing point of the housing when positioning the valve in the regulating chamber. This has the advantage that a preassembled unit—namely the connection housing, the shaft and the spherical control surface—can be inserted into the housing via the connection opening. Another advantage is that, immediately after inserting the preassembled unit into the housing, the valve can be arranged with respect to the housing in a rotation-proof manner by means of the pivot bearing inserted into the bearing point. This can considerably reduce the assembly time.

It is preferably provided that the housing is formed as a single piece, and the inlet opening and the at least one outlet opening as well as the regulating chamber arranged therebetween and the outlet opening are provided in the housing, the outlet opening extending between the regulating chamber and an exterior of the housing. This embodiment means that there are no leaks, as is the case with a multi-part housing.

It is advantageously provided that a closure means which has a seal engaging on the spherical control surface can be inserted into the inlet opening on one side only. Provided that the valve with the spherical control surface is flowed through in only one direction—namely that the medium is fed to the inlet opening—the outlet opening can be formed without such a closure means. Alternatively, it can also be provided that both the inlet opening and the outlet opening each comprise a closure means with a seal which engages on the spherical control surface.

It is advantageously provided that the pivot bearing is a bearing journal which engages in a bearing point in the housing or in a bearing bushing which is provided in the bearing point of the housing. The bearing bushing is preferably made from plastic.

The shaft of the ball valve is preferably mounted in the connection housing with at least one sliding sleeve. This sliding sleeve can be provided adjacent to the upper connection portion of the spherical control surface. This thereby enables, on the one hand, mounting close to the control surface. On the other hand, further mounting can be provided on the opposite end of the shaft on which a drive engages. Sealing elements can also preferably be provided in the region of a shaft feedthrough through the connection housing.

The spherical control surface advantageously has an upper connection portion that is opposite the lower connection portion, wherein at least one inflow opening and/or at least one outflow opening of the passage is provided in the spherical control surface between the connection portions. A pivot bearing is preferably provided on the lower connection portion and the shaft is provided on the upper connection portion. This improves the mounting of the spherical control surface in the regulating chamber of the housing. In addition, using the pivot bearing on the spherical control surface again simplifies assembly.

According to one preferred embodiment, a torsion-proof plug connection is provided between the shaft and the upper connection portion of the spherical control surface. Thus, a pre-mounted assembly can be created by plugging the spherical control surface onto the shaft in order to subsequently insert the connection housing into the connection opening together with the spherical control surface.

Alternatively, it can be provided that the shaft is formed as a single piece with the upper connection portion. For example, instead of the plug connection, a press-fit connection or welded connection or screw connection can be provided to connect the shaft to the spherical control surface.

It is preferably provided that the at least one spherical control surface, the shaft and preferably the pivot bearing and/or preferably the sliding sleeve are formed integrally with one another. This embodiment has the advantage of reducing the number of the component parts. In addition, a play-free structure is created between the shaft and the ball, thereby making hysteresis-free control of the valve possible.

The integral embodiment of the at least one spherical control surface and the shaft and preferably the pivot bearing and/or the sliding sleeve can preferably be effected by way of an injection-moulded part, in particular plastic injection-moulded part, or a cast part. Alternatively, a 3D-printed component or a two-component part can also be provided. It is also possible to design a composite part in which, for example, a passage or a channel is formed by an insert sleeve and the other component parts are formed by overmoulding. Alternatively, the pivot bearing can also be made of metal and connected to the spherical control surface by injection moulding of plastic.

According to a further preferred embodiment of the integral valve that comprises the shaft, the at least one spherical control surface and preferably the pivot bearing and/or preferably the sliding sleeve, it is provided that at least one shaft portion of the shaft and the spherical control surface are formed without burrs. This can result in an improved sealing function and a reduction in seal wear. In particular, edges and/or transitions at the spherical control surface and/or the shaft that come into contact with the at least one seal are rounded.

According to a further embodiment of the invention, it is provided that the spherical control surface is formed on a ball in which the passage between the inflow opening and the outflow opening is formed as a passage channel. Advantageously, the inflow opening is arranged opposite the outflow opening, in particular along a common longitudinal axis. Alternatively, it can also be provided that the outflow opening is arranged at an angle of less than 180° with respect to inflow opening.

It can be provided in particular that the inflow opening and the outflow opening lie in a common plane, however their longitudinal axes are at an angle of less than 180°. Alternatively, it can also be provided that the outflow opening is arranged deviating from the plane or longitudinal axis of the inflow opening.

According to a further preferred embodiment of the invention, it is provided that at least two spherical control surfaces are aligned with respect to the longitudinal axis of the shaft and can be jointly controlled by the shaft. These two spherical control surfaces can preferably have a different alignment with respect to the respective inflow opening and/or the outflow opening. As a result, a multi-way valve can be formed in a simple manner.

One preferred embodiment of the ball valve, which is for example a cast part or moulded part, provides that at least one recess is provided on the ball and/or on the shaft to reduce an accumulation of material. Such a depression or recess has the advantage of avoiding sinking due to large-volume material accumulations, thereby resulting in an increased dimensional stability of the ball valve. By way of example, the shaft can be a hollow shaft. One or a plurality of recesses can be provided on the ball, said recesses extending between the control surface and the at least one passage.

Furthermore, it can preferably be provided, in particular in ball valves with a only little or small structural volume, that the ball and the shaft are made from a solid material. In the case of such small-sized ball valves, there may be no more room for a recess or depression.

According to a further preferred embodiment of the invention, it is provided that the spherical control surface is formed on or as a shell segment in which the inflow opening is arranged. The passage is formed through the wall thickness of the shell segment and the exit opening is on the opposite side to the inflow opening of the shell segment. Such shell segments represent a further simplified embodiment. This shell segment, the shaft and/or the pivot bearing can likewise preferably be a plastic injection-moulded part, cast part or 3D-printed component.

The ball valve can preferably be a switching valve, a metering valve, a multi-way valve or an expansion valve.

Figure 2:
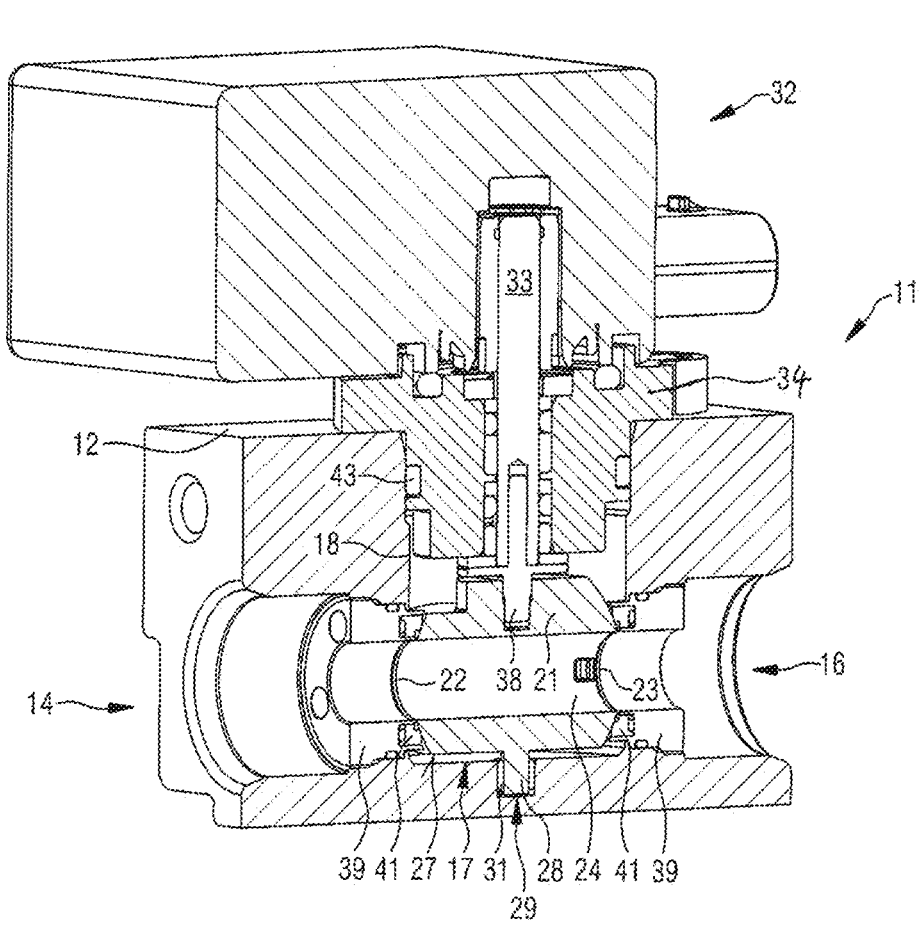
Figure 4:
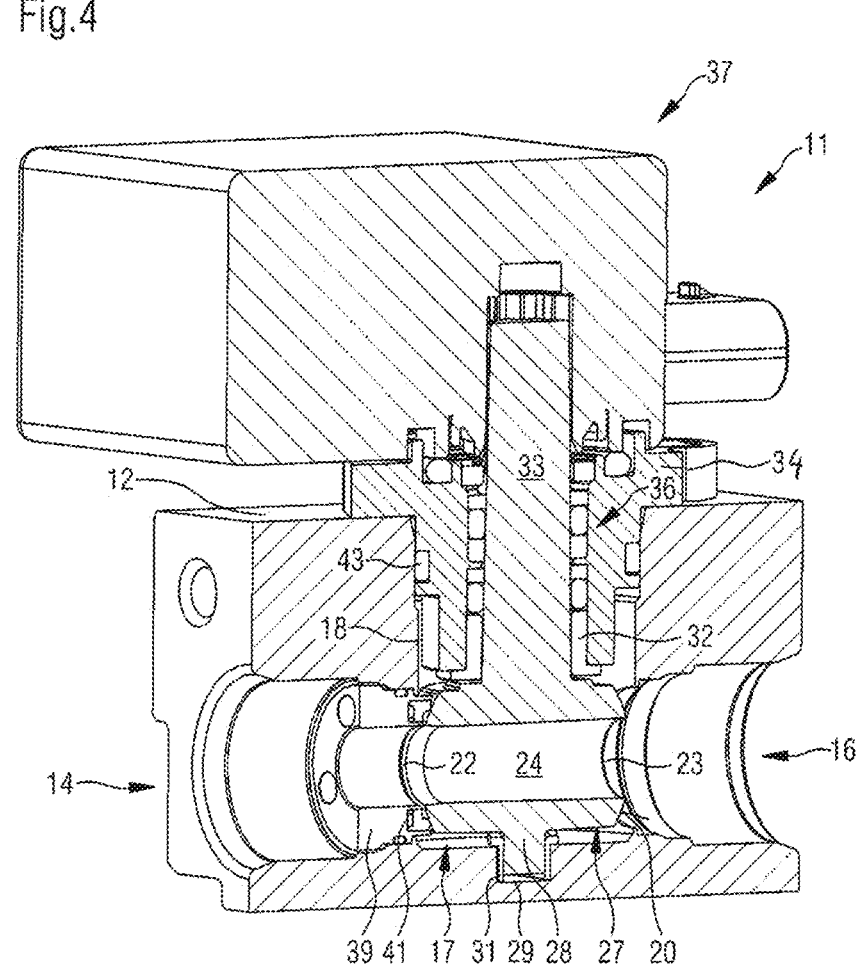
Figure 5:
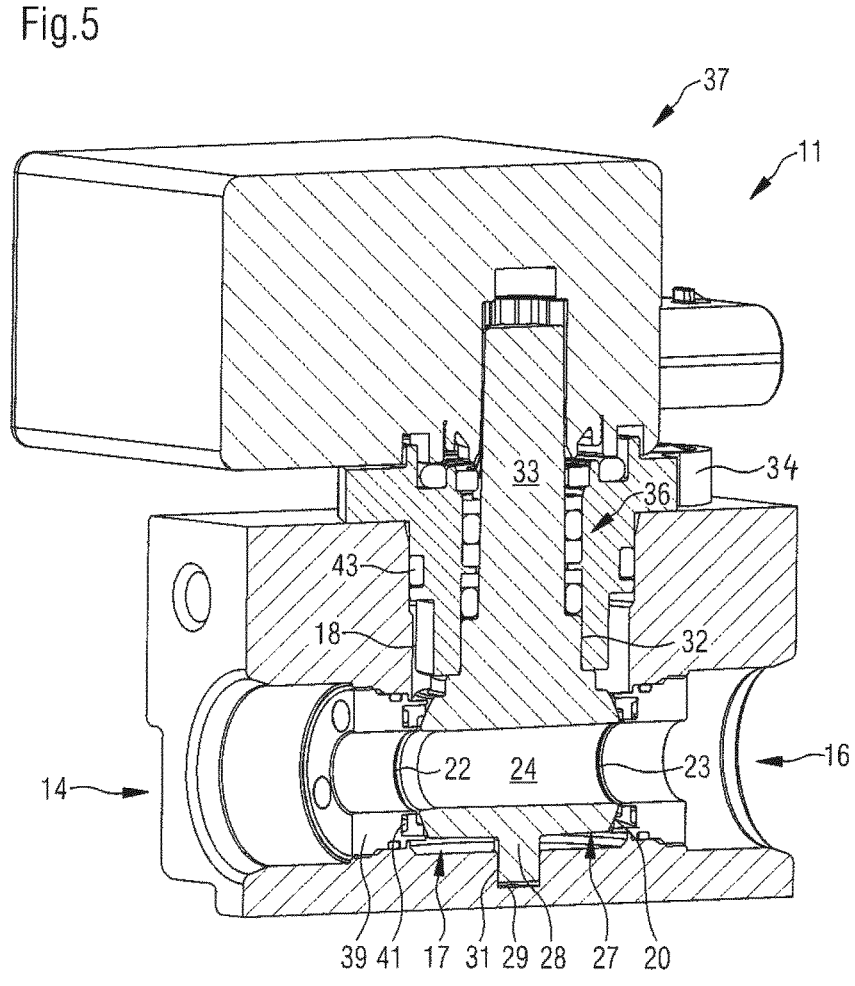
Figure 6:
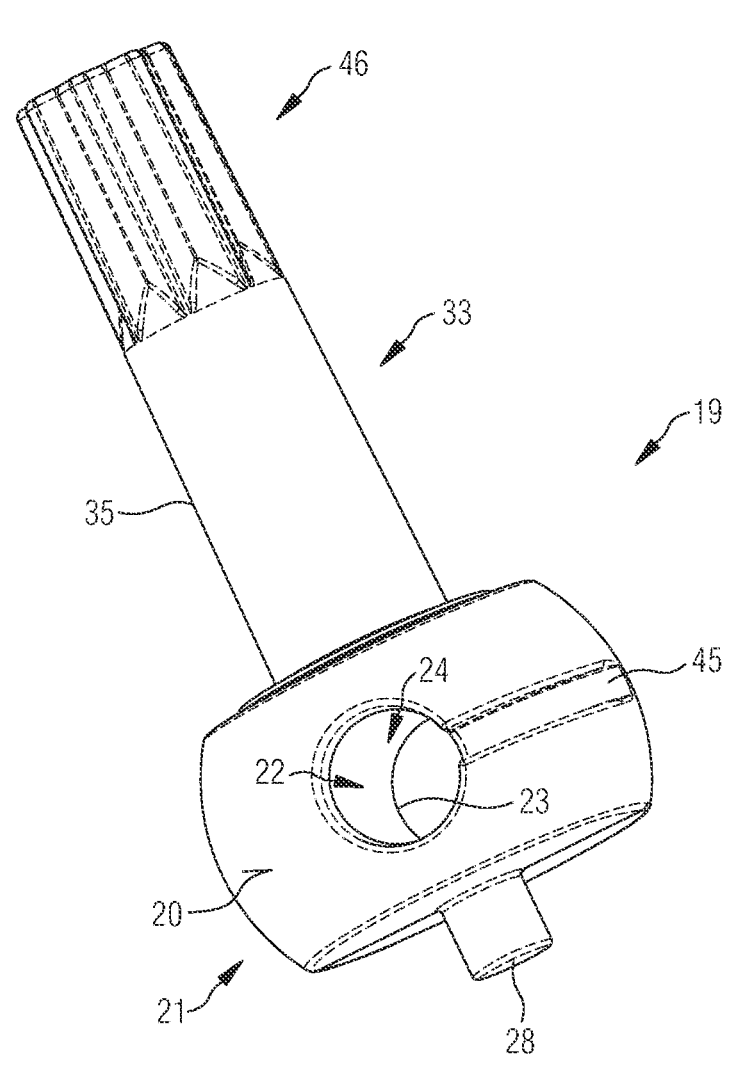
Figures 7, 8:
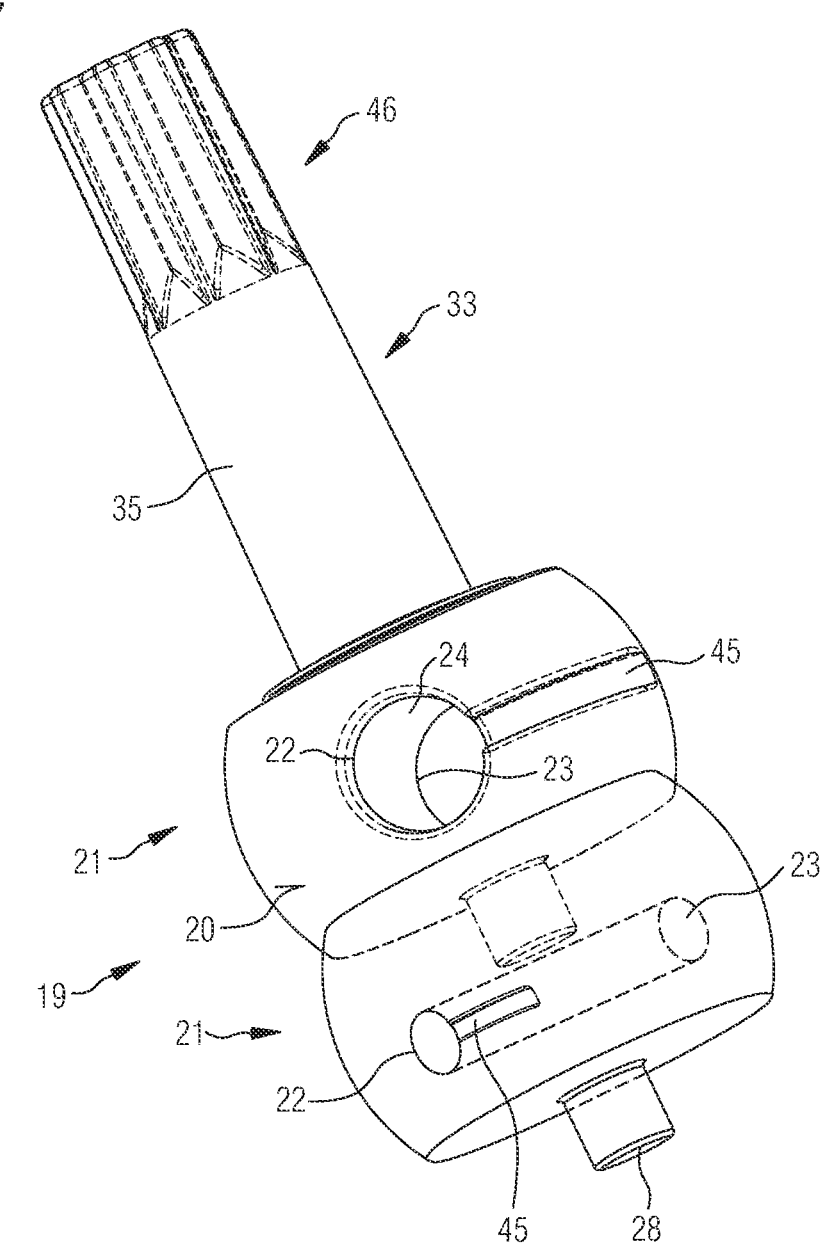
Figures 9, 10:
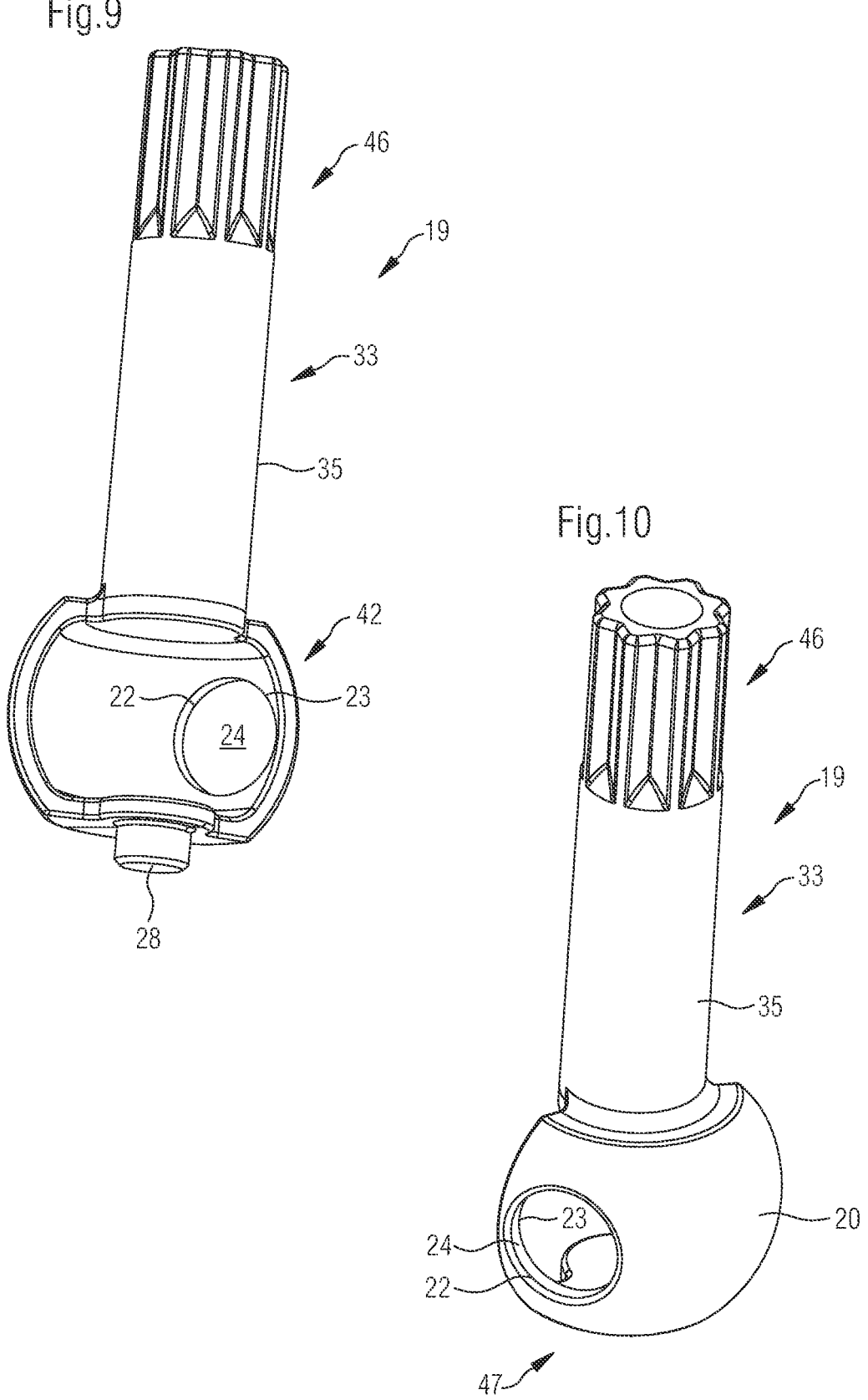
Figure 13:
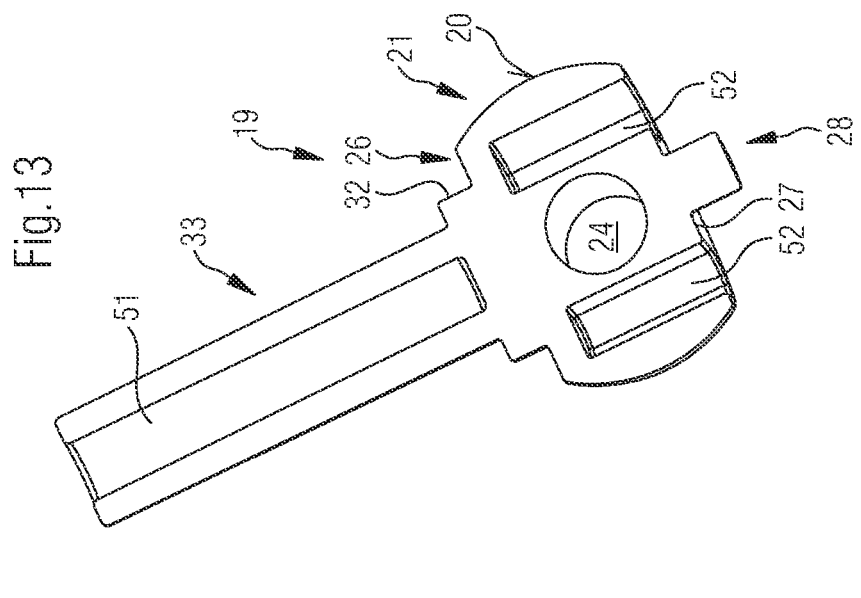
Figure 12:
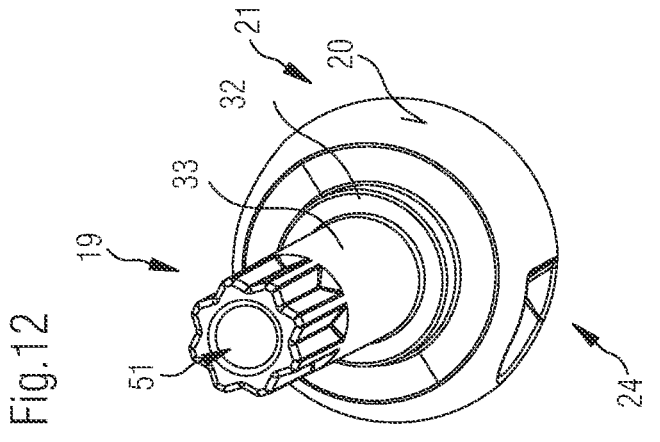
Figure 11:
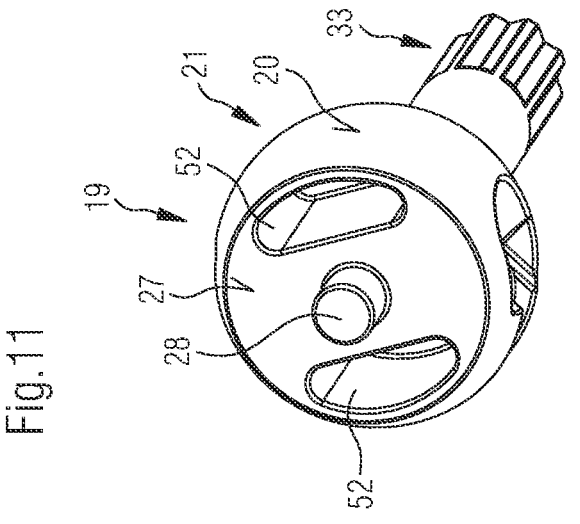

The invention and further advantageous embodiments and developments are described and explained in more detail below with reference to the examples shown in the drawings. The features to be taken from the description and the drawings can be applied individually or in any combination according to the invention. The drawings show:

FIG. 1 a schematic sectional view of a ball valve,

FIG. 2 a schematic sectional view of an alternative embodiment of the ball valve from FIG. 1, FIG. 3 a schematic sectional view of an alternative embodiment of the ball valve from FIG. 1, FIG. 4 a schematic sectional view of an alternative embodiment of the ball valve from FIG. 1, FIG. 5 a schematic sectional view of an alternative embodiment of the ball valve from FIG. 4, FIG. 6 a perspective view of the valve according to FIG. 4, FIG. 7 a perspective view of an alternative embodiment of the valve from FIG. 6, FIG. 8 a schematic sectional view of passage channels of the valve according to FIG. 7, FIG. 9 a perspective view of an alternative embodiment of the valve from FIG. 6, FIG. 10 a further schematic view of the valve according to FIG. 9, FIG. 11 a perspective view from below of an alternative embodiment of the valve from FIG. 6, FIG. 12 a perspective view from above of the valve according to FIG. 11, and FIG. 13 a schematic sectional view of the valve according to FIG. 11.

FIG. 1 shows a schematic sectional view of a ball valve 11. Such a ball valve 11 can be provided in a refrigerant circuit of a refrigeration system, in particular in the vehicle. The ball valve 11 comprises a housing 12 with an inlet opening 14 and an outlet opening 16. Purely by way of example, the inlet opening 14 and the outlet opening 16 are provided opposite each other. The outlet opening 16 can also be arranged in different positions in relation to the inlet opening 14.

A regulating chamber 17 is provided between the inlet opening 14 and the outlet opening 16. Furthermore, the housing 12 comprises a connection opening 18, which connects an exterior of the housing 12 to the regulating chamber 17. A valve 19 is arranged in the regulating chamber 17. This valve 19 comprises a spherical control surface 20. In the exemplary embodiment, the spherical control surface is formed on a ball 21. This ball 21 comprises an inflow opening 22 and an outflow opening 23. The inflow opening 22 and the outflow opening 23 are connected to one another by a passage 24. This passage 24 is a channel, for example.

The ball 21 has an upper connection portion 26 and a lower connection portion 27. A pivot bearing 28 is provided on the lower connection portion 27. This pivot bearing 28 can be a journal. This pivot bearing 28 is preferably mounted rotatably in a bearing point 29 in the housing 12. Advantageously, a bearing bushing 31 can be provided in the bearing point 29 to receive the pivot bearing 28. This can improve guidance.

A shaft 33 engages on the upper connection point 26 of the ball 21. This shaft 33 is guided in a connection housing 34. A shaft feedthrough 36 is preferably provided between the shaft 33 and the connection housing 34, thereby enabling a friction-free and/or sealed mounting of the shaft 33 with respect to the connection housing 34.

An upper end of the shaft 33 is guided out opposite the connection housing 34. This upper end of the shaft 33 is rotatably connected to a drive 37. Switching positions of the valve 19 are controlled by this drive 37.

In order to position the valve 19 in the regulating chamber 17, the valve 19 and the connection housing 34 are inserted together into the housing 12 via the connection opening 18. A closure means 39 is then inserted into the inlet opening 14. This closure means 39 has a seal 41 facing the spherical control surface 20. In a switching position, in which the inflow opening 22 is outside the inlet opening 14, the inlet opening 14 is closed so that no medium can reach the outlet opening 16. The spherical control surface 20 of the ball 21 has the advantage for the seal 41 that, regardless of the switching position, the seal 41 can always bear against spherical control surface 20 in at least two places. The seal preferably bears circumferentially against the ball.

After inserting the connection housing 34 into the connection opening 18 in the housing 12, a detachable fixing, in particular screwing, to the housing 12 preferably takes place. At the same time, the connection opening 18 is sealed therebetween by at least one seal 43.

In this arrangement according to FIG. 1, it can be provided that no further sealing element bears against the spherical control surface 20 in the outflow opening 23.

The connection between the shaft 33 and the spherical control surface 20 or the ball 21 is torsion-proof. Preferably, a plug connection 38 is provided. Alternatively, a press-fit connection, an adhesive connection or a screw connection can also be provided.

FIG. 2 shows a schematic sectional view of an alternative embodiment of the ball valve 11 according to FIG. 1. In this embodiment, a closure means 39 with a seal 41 is likewise provided in the outlet opening 16. In all other respects, the design corresponds to the ball valve according to FIG. 1.

This embodiment of the ball valve 11 has the advantage that the inlet opening 14 and the outlet opening 16 can also be interchanged with respect to the flow direction of the mass flow to be controlled.

Figure 3:
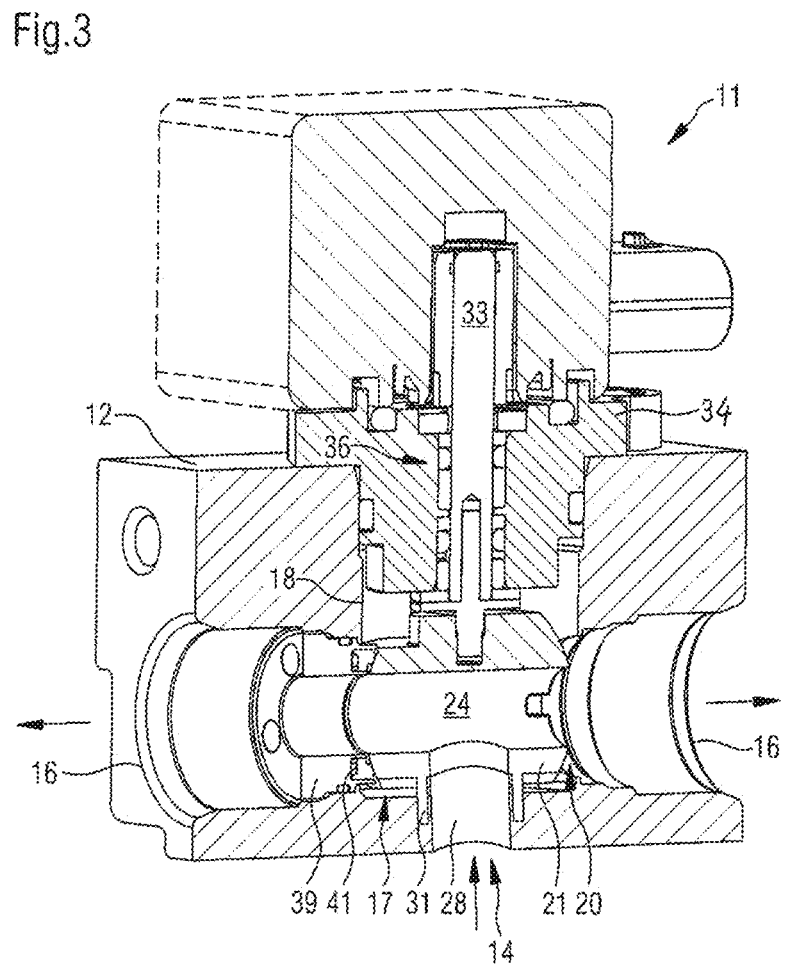

FIG. 3 shows an alternative embodiment of the ball valve 11 to FIG. 1. This ball valve 11 comprises an inlet opening 14 and two outlet openings 16. For this purpose, a T-shaped passage 24 is formed in the ball 21. By way of example, a central inflow opening 22 is provided on the ball 21, the longitudinal axis of which lies along the longitudinal axis of the shaft 33. The two outlet openings 23 can, as shown, be opposite each other in the spherical control surface 20, i.e. offset by 180°. Alternatively, it can be provided that the two outflow openings 23 are positioned at an angle of less than 180° in the same plane, so that the switching position of the valve 19 initially opens one outlet opening 16 and subsequently or in overlap therewith the second outlet opening 16 is likewise opened. The inflow and outflow openings 22, 23 in the valve 19 can also be interchanged as desired.

It is provided in this embodiment that the pivot bearing 28 is an annular collar and the inflow opening 22 is provided, for example, within the annular collar.

FIG. 4 shows a further alternative embodiment of the ball valve 11. It is provided in this embodiment that the valve 19 is formed as a single piece. The spherical control surface 20 and the shaft 33 and preferably also the pivot bearing 28 are formed from a single part. The spherical control surface 20 is preferably formed on a ball 21. Advantageously, the valve 19 according to FIG. 4 is a plastic injection-moulded part. The valve 19 is preferably mounted and guided in the connection housing 34 with a sliding sleeve 32. The arrangement of a bearing bushing 31, which is associated with the lower connection portion 27, and the sliding sleeve 32, which is associated with the upper connection portion 26, can enable precise mounting of the valve 19. In addition to the sliding sleeve 32, the shaft feedthrough 36 is also provided in the connection housing 34. In all other respects, this embodiment of the ball valve 11 corresponds to the design according to FIG. 1.

FIG. 5 shows an alternative embodiment of the valve 19. In all other respects, this embodiment corresponds to the embodiment according to FIG. 1, 2 or 4.

In this embodiment, the sliding sleeve 32 is formed or moulded as a single part on the valve 19. Thus, the sliding sleeve 32, like the pivot bearing 28, can be formed integrally with the ball 21 and the shaft 33.

FIG. 6 shows a perspective view of the valve 19 according to FIG. 4. Associated with the inflow opening 22, the spherical control surface 20 can have an inflow depression 45 in the radial direction. This merges flush with the spherical control surface 20. This allows a continuous build-up of pressure to be generated in the passage 24 when the valve 19 is actuated. Alternatively, the valve 19 can also be controlled to expand the medium. The ball valve 11 can be an expansion valve.

The upper end of the shaft 33 comprises a toothing 46, which enables a torsion-proof arrangement with the drive

37. Advantageously, another bearing sleeve can be provided between the drive 37 and the toothing of the shaft 33.

In this single-piece embodiment of the valve 19, at least one shaft portion 35 of the shaft 33 and/or the spherical control surface 20 are formed without burrs.

FIG. 7 shows a perspective view of an alternative embodiment to FIG. 6. In this embodiment of the valve 19, two spherical control surfaces 20 are arranged in a row along the longitudinal axis of the shaft 33, for example. By way of example, the lower ball 21 can be plugged or pressed onto the upper ball 21 or also moulded thereon. This embodiment according to FIG. 6 can also be formed from a single part, for example as a plastic injection-moulded part. Such a valve 19 allows the inflow openings 22 and/or outflow openings 23 to be aligned radially offset to one another. By way of example, FIG. 7 shows a schematic view from which it is apparent, for example, that the passages 24 are offset from each other at an angle of, for example, 30°.

Such a valve 19 can, for example, create a two-way valve.

FIG. 9 shows a first perspective view and FIG. 10 shows a second perspective view of an alternative embodiment of the valve 19 to FIG. 6. It is provided in this embodiment that the spherical control surface 20 is formed on or as a shell segment 47. An inflow opening 22 is provided in the shell segment 47. The passage 24 can be formed through the wall thickness of the shell segment 47. The outflow opening 23 is opposite the inflow opening 22, for example on the inside of the shell segment 47. The shell segment 47 comprises the spherical control surface 20 adjacent to the inflow opening 22. This enables the inlet opening 14 in the housing 12 to be completely closed when the valve 19 is rotated.

This valve 19 according to FIGS. 9 and 10 can also be formed as a single injection-moulded part or composite part.

FIG. 11 shows a schematic view from below of an alternative embodiment of the valve 19. FIG. 12 shows a perspective view from above of the valve 19 according to FIG. 11. FIG. 13 shows a schematic sectional view of the valve 19 according to FIGS. 11 and 12.

This valve 19 is formed as a single part. By way of example, this valve 19 can be a plastic injection-moulded part. The shaft 33 can have a recess 51. This recess 51 can extend from the front end, for example to the sliding sleeve 32 or into the ball 21.

At least one recess 52 is provided in the ball 21. Two recesses 52 are shown by way of example in the exemplary embodiment. These recesses 52 extend from the lower connection portion 27 towards the upper connection portion 26. This at least one recess 52 is surrounded by the control surface 20. This recess 52 can also extend between the control surface 20 and the passage 24.

The combination of the recesses 51 and 52 can be as desired. These recesses 51, 52 serve to avoid an accumulation of material. As a result, sinking can be avoided and a high degree of dimensional stability can be achieved. In addition, a hollow shaft can be formed by the recess 51, for example, which has a high rigidity and also a high torsional moment. In particular, this can also reduce the weight of the valve 19.

The invention claimed is:

1. Ball valve,
   having a housing which comprises at least one inlet opening and at least one outlet opening between which a regulating chamber is provided,
   having a valve which is arranged in the regulating chamber and comprises at least one spherical control surface with at least one passage that connects an inflow opening to an outflow opening of the valve, having a connection opening in the housing, which opens into the regulating chamber into which a connection housing is insertable, wherein at least one seal is provided between the connection housing and the connection opening and the connection housing comprises a shaft feedthrough having a shaft mounted therein to control the valve, wherein the at least one spherical control surface is insertable through the connection opening of the housing into the regulating chamber and is positionable between the inlet opening and the outlet opening, which is provided opposite to the shaft connected with the at least one spherical control surface and the connection opening, and the at least one spherical control surface has a lower connection portion on which a pivot bearing is provided which is positionable in a bearing point of the housing when positioning the at least one spherical control surface in the regulating chamber.

2. Ball valve according to claim 1, characterised in that the housing is formed as a single piece, and the inlet opening and the at least one outlet opening as well as the regulating chamber arranged therebetween and the connection opening are provided in the housing, which connection opening extends between the regulating chamber and an exterior of the housing.

3. Ball valve according to claim 1, characterised in that a closure which has a seal engaging on the spherical control surface is insertable into the inlet opening on one side only, or in that a closure which comprises a seal engaging on the spherical control surface is insertable into the inlet opening and the outlet opening respectively on both sides of the regulating chamber.

4. Ball valve according to claim 1, wherein the pivot bearing is a bearing journal or annular collar, and the pivot bearing engages in a bearing point in the housing or in a bearing bushing which is provided in the bearing point of the housing.

5. Ball valve according to claim 1, wherein the shaft is mounted in the connection housing with at least one sliding sleeve.

6. Ball valve according to claim 1, wherein the spherical control surface has an upper connection portion that is opposite the lower connection portion, wherein the pivot bearing is provided on the lower connection portion and the shaft is provided lying opposite on the upper connection portion.

7. Ball valve according to claim 6, wherein a torsion-proof plug connection is provided between the shaft and the upper connection portion, or in that the shaft is formed as a single piece with the upper connection portion.

8. Ball valve according to claim 1, wherein the at least one spherical control surface, the shaft or in that the at least one spherical control surface and the shaft and the pivot bearing or in that the at least one spherical control surface and the shaft and the pivot bearing and the sliding sleeve are formed integrally with one another.

9. Ball valve according to claim 8, wherein the at least one spherical control surface and/or the shaft, or in that the at least one spherical control surface and the shaft and the pivot bearing, or in that the at least one spherical control surface and the shaft and the pivot bearing and the sliding sleeve are formed as a plastic injection-moulded part or a composite part or a two-component part.

10. Ball valve according to claim 1, wherein at least one shaft portion of the shaft and the spherical control surface are formed without burrs.

11. Ball valve according to claim 1, wherein the spherical control surface is formed on a ball in which the at least one passage between the inflow opening and the outflow opening is formed as a passage channel, wherein the outflow opening is opposite the inflow opening or is aligned at an angle of less than 180°.

12. Ball valve according to claim 11, wherein at least one recess is provided on the ball and/or the shaft to reduce an accumulation of material, or in that the ball and the shaft are made from a solid material.

13. Ball valve according to claim 1, wherein the spherical control surface is formed on or as a shell segment which extends only partially in a radial direction.

14. Ball valve according to claim 1, wherein at least two spherical control surfaces are aligned in a row along the longitudinal axis of the shaft and is jointly controllable by the shaft.

15. Ball valve according to claim 1, wherein the ball valve is a switching valve, a metering valve, a multi-way valve or an expansion valve.

16. Ball valve according to claim 1, wherein the spherical control surface is formed on or as a shell segment which extends only partially in a radial direction and the passage is formed through the wall thickness of the shell segment.

* * * * *